US005161293A

United States Patent [19]

Ebbert

[11] Patent Number: 5,161,293

[45] Date of Patent: Nov. 10, 1992

[54] ADJUSTABLE HANDLE FOR HAND TOOL

[75] Inventor: Robert Ebbert, Rochester Hills, Mich.

[73] Assignee: Ebbert Engineering, Inc., Troy, Mich.

[21] Appl. No.: 684,976

[22] Filed: Apr. 15, 1991

[51] Int. Cl.[5] .......................... B21K 5/18; B23P 19/04

[52] U.S. Cl. .......................................... 29/242; 29/270; 81/177.8

[58] Field of Search .............. 29/242, 243.524, 243.54, 29/270; 7/167, 168; 81/177.1, 177.8, 489, 490, 491, 439; 408/20

[56] References Cited

U.S. PATENT DOCUMENTS

| | | | |
|---|---|---|---|
| 4,381,579 | 5/1983 | Rumpp | 81/177.1 X |
| 4,522,270 | 6/1985 | Kishi | 81/177.1 X |
| 4,759,240 | 7/1988 | Lin | 81/177.8 |
| 4,776,246 | 10/1988 | Elliston | 81/439 |
| 4,805,494 | 2/1989 | Santoro | 81/489 X |
| 4,962,681 | 10/1990 | Yang | 7/167 X |

*Primary Examiner*—Joseph M. Gorski
*Assistant Examiner*—Peter Dungba Vo
*Attorney, Agent, or Firm*—Lloyd M. Forster

[57] ABSTRACT

Production hand tool equipped with pistol grip type handle for manipulating the tool at a comfortable angle including pivotal means for adjusting the angular relation of the handle in the central plane of the tool in order to optimize hand comfort in operation and relieve muscular fatigue incident to operating the tool over protracted periods at a constant angle. A male and female toroidal segment connection establishes a virtual transverse pivotal axis with handle rigidly secured by an internal clamp having cylindrical segment area bearing contact on an interior hollow connection end of the handle.

20 Claims, 2 Drawing Sheets

ADJUSTABLE HANDLE FOR HAND TOOL

BACKGROUND OF THE INVENTION

Many hand tools are provided with handles oriented in the general configuration of a pistol grip inclined rearwardly to accommodate a comfortable forward facing attitude of the operational end of the tool. Examples are production hand tools such as power driven screwdrivers, wrenches, hammers, hand drills and as particularly illustrated in the present disclosure, rivet gun hand tools.

While the handles are normally oriented in the most comfortable position to accommodate the intended use, ergometric considerations have long revealed inherent muscle fatigue from operation of hand tools with fixed handle orientation, particularly in the case of production tools where the same operation is repeated over prolonged periods of time. Such considerations have established a long felt need for a simple, economic and preferably versatile means for adjusting the angular relationship between the handle and the main body of the tool in order to accommodate occassional change in orientation to relieve hand muscles involved, as well as to optimize handle position for specific, particularly repetitive operations.

BRIEF DESCRIPTION OF THE PRESENT INVENTION

Applicant owns a business which has manufactured hand riveting tools for many years with knowledge of the foregoing problem and potential desirabililty of an adjustable handle. However, any prior contemplated solutions have had drawback and objections which have prevented adoption. Requirements for an adjustable handle in the manufacture of industrial production hand tools include avoidance of sharp corners or open gaps associated with adjustment, rigid operating retention of any adjusted position, accommodation of trigger actuation, and compatability with a general comfortable configuration of the handle grip.

Such requirements have necessitated an extensive exploration of numerous experimental designs which have led finally to the conception of the present male and female toroidal arc connection joint where the major circular arc extends in the longitudinal plane of adjustment, with the handle providing the male connecting surface matching the female torodial arc recess in the body of the tool; and where the minor toroidal circular arc extends transversely in like matching male and female surface engagement. A hollow handle construction accommodates an internal clamp with a connecting screw engaging a threaded hole in the body which permits screwdriver insertion for loosening, adjusting, and retightening handle retention.

This provides a solid rigid relation between handle and tool body with full area contact in the matching toroidal surfaces and with the matching engagement completely orienting the handle position with respect to longitudinal and lateral relationship as well as stability against twisting throughout the entire adjustment range. A 20° adjustment range has been provided extending from 10° to 30° backward inclination relative to the centerline of the tool.

DETAILED DESCRIPTION OF PREFERRED EMBODIMENT

Figure 1:
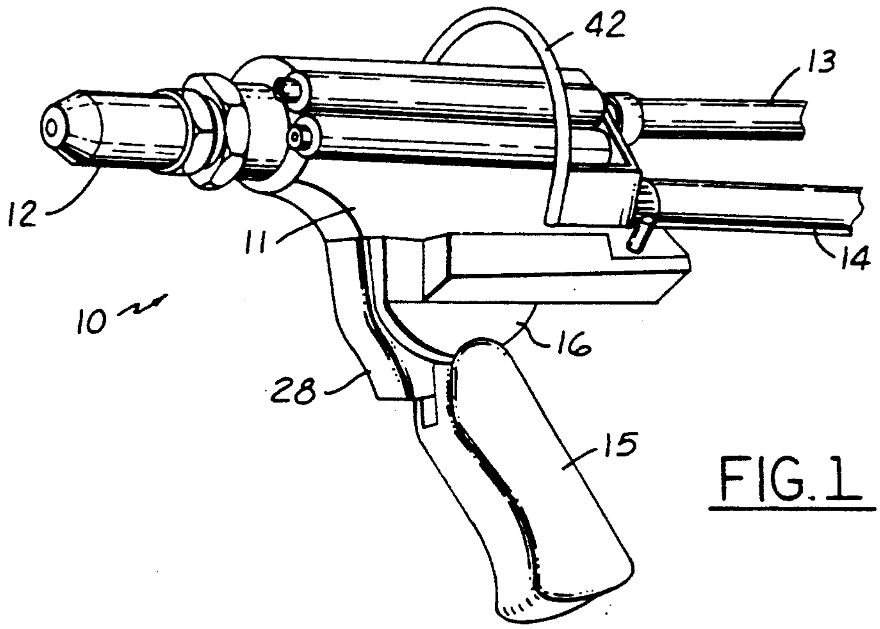
FIG. 1. is a perspective view of a hand tool equipped with the adjustable handle of the present invention.

With reference to FIG. 1, hand tool assembly 10, a rivet gun in the present embodiment, is provided with body 11, rivet mandrel retrieval tube 12 leading to retrieval hose 13, and air supply passage 14. Internal piston cylinder and related valve mechanism correspond to the rivet hand gun assembly disclosed in U.S. Pat. No 4,130,006 as shown in detail, particularly in FIG. 6 of such patent.

Figure 2:
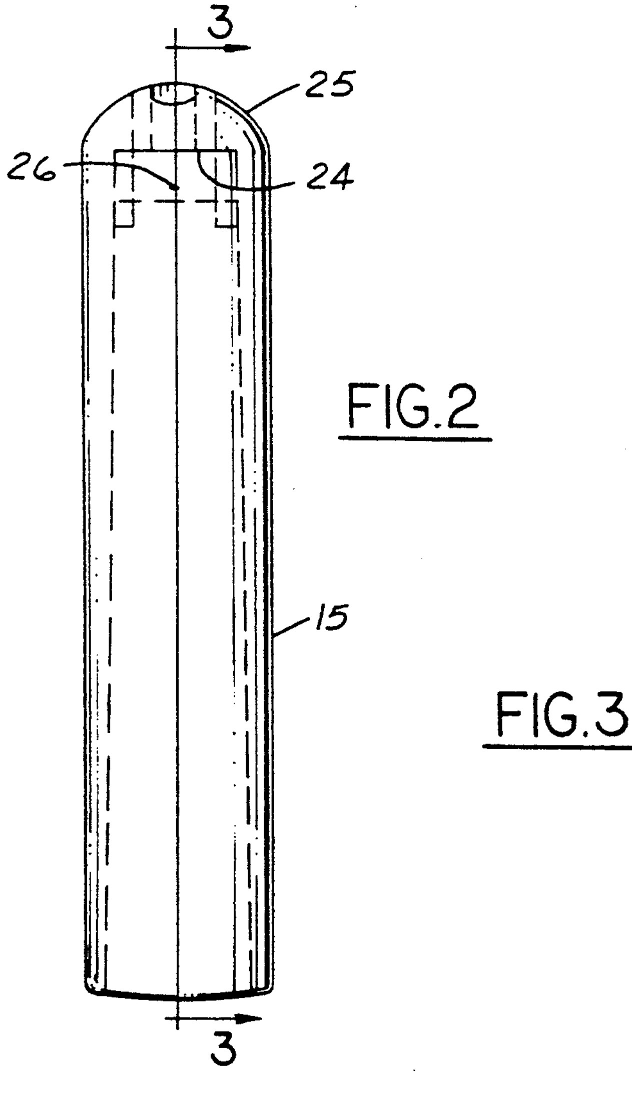
FIG. 2 is a front view of the handle illustrated in FIG. 1.
Figure 3:
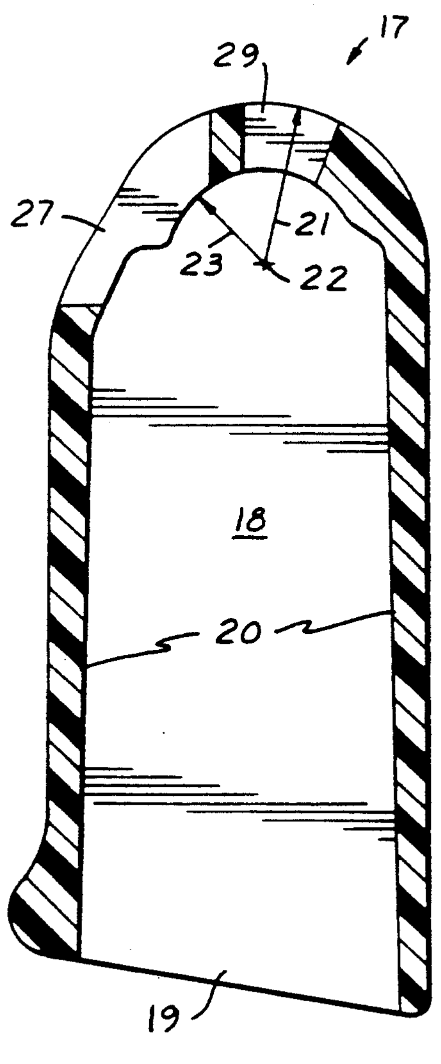
FIG. 3 is a sectional view taken along the line 3-3 of FIG. 2.
Figure 4:
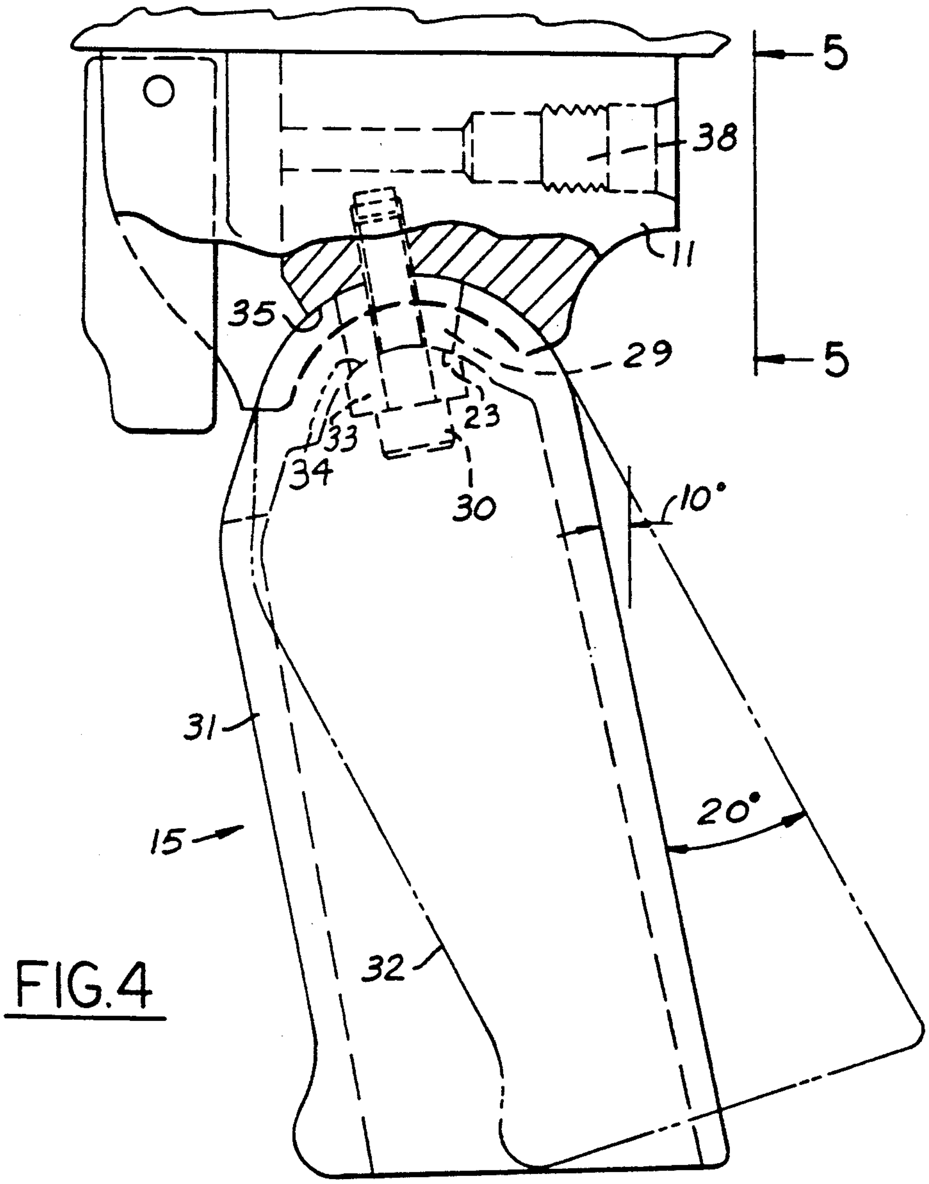
FIG. 4 is a partially sectioned fragmentary side elevation of the handle illustrated in FIG. 3 shown in assembled relation to the body of the hand tool.

Adjustable handle 15 attached to underside socket 16 of body 11 comprises the principal subject matter of the present invention as illustrated in enlarged views of FIGS. 2, 3 and 4. Handle 15 may be formed as a hollow metal casting or die casting, but is preferably formed as nonmetallic injection molding having toroidal attachment end 17, internal cavity 18, open access bottom end 19 and wall 20 of appropriate thickness for handle rigidity.

As shown in sectional side view of FIG. 3, major radius 21 of toroidal end 17, centered at 22, extends in adjustment plane of FIG. 3 with concentric internal radius 23, formed as a cylindrical segment bearing surface 24, as further illustrated in FIG. 2, which also shows the minor toroidal transverse arcuate end surface 25 centered at 26.

Trigger clearance slot 27 for trigger 28, shown in FIG. 1, extends through cavity 18; also attachment screw slot 29 shown assembled in FIG. 4 with clamp screw 30 passing through at one extremity of the slot corresponding to the full line position shown at 31 providing clearance for handle adjustment to the phantom position shown at 32. This provides a 20° range of adjustment relative to a 10° backward inclination at the solid line extremity illustrated in FIG. 4.

Clamp element 33 is provided with a male cylindrical segment surface 34 matching radius 23 which accommodates the full range of adjustment with area clamping contact throughout. Likewise, concave toroidal segment recess in body 11, formed with major circular arc in the center plane of adjustment, and minor toroidal segment circular arc 36 extending transversely as illustrated in FIG. 5, provide true area contact between handle and body throughout the range of adjustment.

Handle 15 is positively oriented in alignment with the body upon tightening clamp screw 30 against any rotational twisting, misalignment or any lateral deflection out of the central plane of the tool. This is totally accomplished by the matching male and female toroidal surfaces clamped in rigid relation by single screw 30 and clamp element 33.

Figure 5:
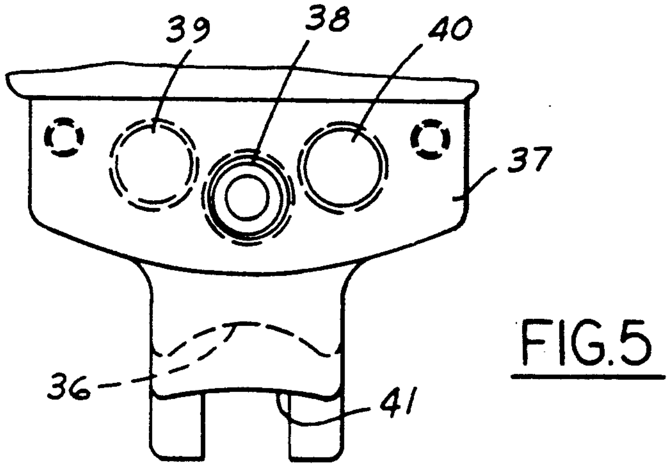
FIG. 5 is a rear view of the body taken along the line 5-5 of FIG. 4.

With further reference to FIG. 5, valve block 37 is provided with threaded aperture 38 for trigger actuated valve installation, pipe tap 39 for air inlet and pipe tap 40 for air outlet. Curved lower edge 41 blends with exposed toroidal handle surface 29 to avoid any hand discomforting gap opening.

I claim:

1. An adjustable handle for a hand tool having a tool body with means for performing an operation comprising:

pistol grip handle means adjustably connected to said tool body for hand manipulation of said hand tool, and means for adjustably connecting said pistol grip handle means to said tool body, said adjustably connecting means being used for clamping, releasing, and adjusting said pistol grip handle means to any angular position within a predetermined range relative to said tool body and reclamping said handle means to said tool body in said angular position within a continous variable angular adjustment relationship of said pistol grip handle means relative to said tool body in a central plane of said operation of said hand tool.

2. The adjustable handle for a hand tool of claim 1 including means for confining said angular adjustment to said central plane.

3. The adjustable handle for a hand tool of claim 1 wherein said means for adjusting includes single screw retained clamping means for rigidly fixed operating relation.

4. The adjustable handle for a hand tool of claim 1 including means for confining said continously variable adjustment to a limited angular range on a transverse axis appropriate for ergometric comfort.

5. The adjustable handle for a hand tool of claim 4 wherein said limited angular range is in the order of 20°.

6. The adjustable handle for a hand tool of claim 5 wherein said limited angular range extends substantially with a range of 10° to 30° of pistol grip handle inclination backwards from a normal relation to the center plane of said body.

7. The adjustable handle for a hand tool of claim 1 including male and female arcuate adjustment connection means between said handle means and said body.

8. The adjustable handle for a hand tool of claim 7 including circular arcuate surface connection means adjustable about a transverse axis.

9. The adjustable handle for a hand tool of claim 8 including matching torus segment surface connecting means having major and minor circular contact arcs.

10. The adjustable handle for a hand tool of claim 9 wherein the major circular arc of said torus extends in a plane of adjustment comprising the central plane of tool operation.

11. The adjustable handle for a hand tool of claim 10 wherein the major and minor circular arcs of said torus extend to an exposed surface of said handle at its rearward juncture with said body.

12. The adjustable handle for a hand tool of claim 11 wherein the circular arcs of said torus extend to an exposed surface of said body blending with the rearward exposed surface of said handle means.

13. The adjustable handle for a hand tool of claim 12 wherein said body is provided with a concave arcuate surface blending into a matching arcuate juncture with said torus circular of said handle.

14. The adjustable handle for a hand tool of claim 1 including hollow handle means with a closed slotted end including a male toroidal end connecting surface, and screw clamp connecting means for retaining matching male and female toroidal connecting surfaces into adjusted operating position.

15. The adjustable handle for a hand tool of claim 14 including a connecting clamp element (33) having a cylindrical arcuate surface (34) matching a cylindrical arcuate inside end surface (23) of said handle means, and wherein said arcuate surfaces are concentric with the major circular arc of said toroidal connecting surfaces.

16. The adjustable handle for a hand tool of claim 14 wherein said handle means is constructed of rigid molded material.

17. The adjustable handle for a hand tool of claim 14 wherein said handle means is constructed of rigid nonmetallic molded material.

18. The adjustable handle for a hand tool of claim 14 including a finger trigger operated control, and said handle means including a trigger slot accommodating the adjustment of handle position.

19. The adjustable handle for a hand tool of claim 18 comprising a trigger controlled rivet gun having forward facing rivet processing means, actuating means within said body, and related flexible power connections extending from the rear end of said body.

20. The adjustable handle for a hand tool of claim 1 including connecting means at the top of said body for flexibly supporting the weight of said hand tool to accommodate its manipulation for performing riveting operations.

* * * * *